Sept. 8, 1970  G. R. WINDERS  3,527,670
APPARATUS FOR CONTROLLING A CONTROL ROD IN A NUCLEAR REACTOR
Original Filed Aug. 19, 1965  3 Sheets-Sheet 1
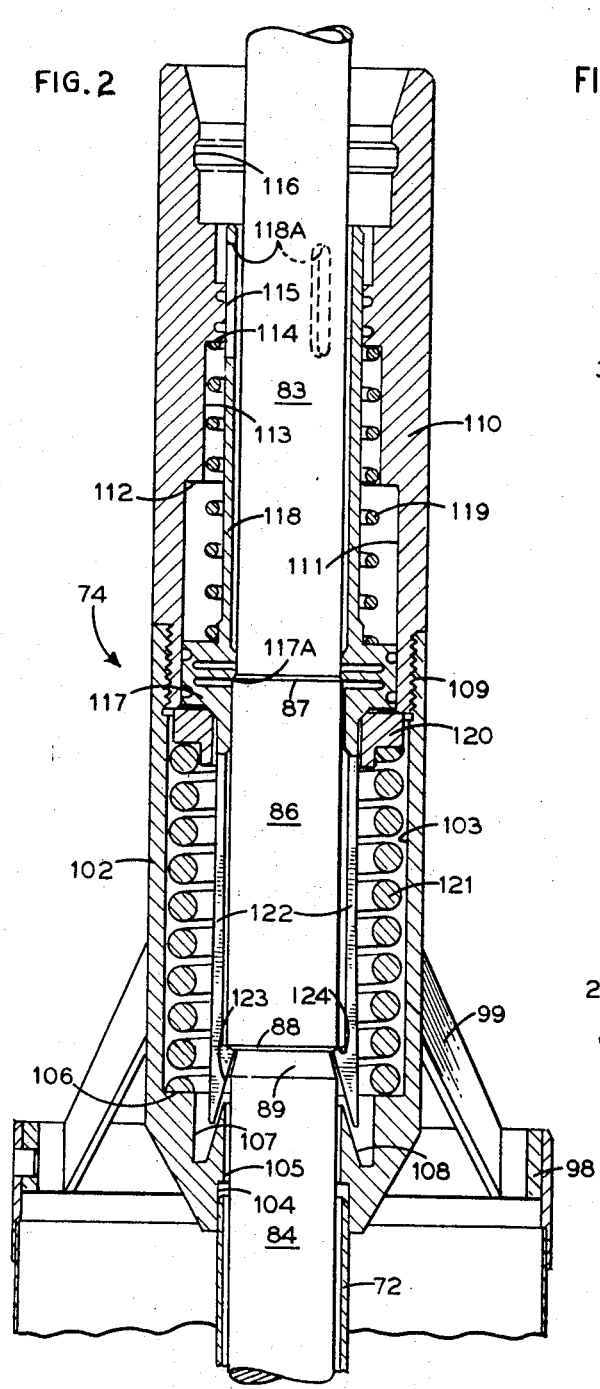
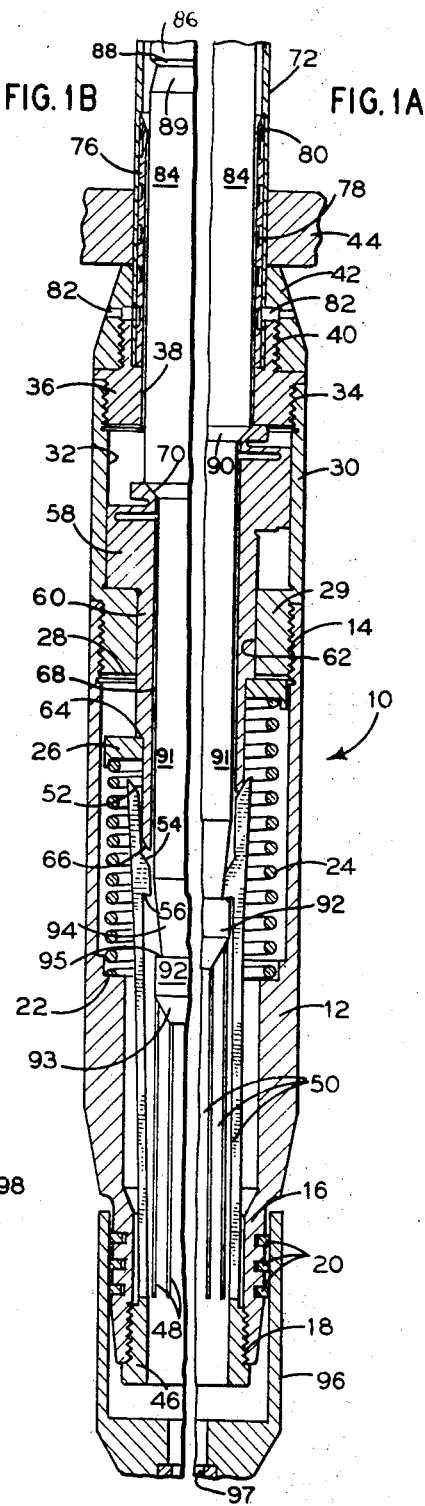
INVENTOR
Gordon R. Winders
BY
ATTORNEY

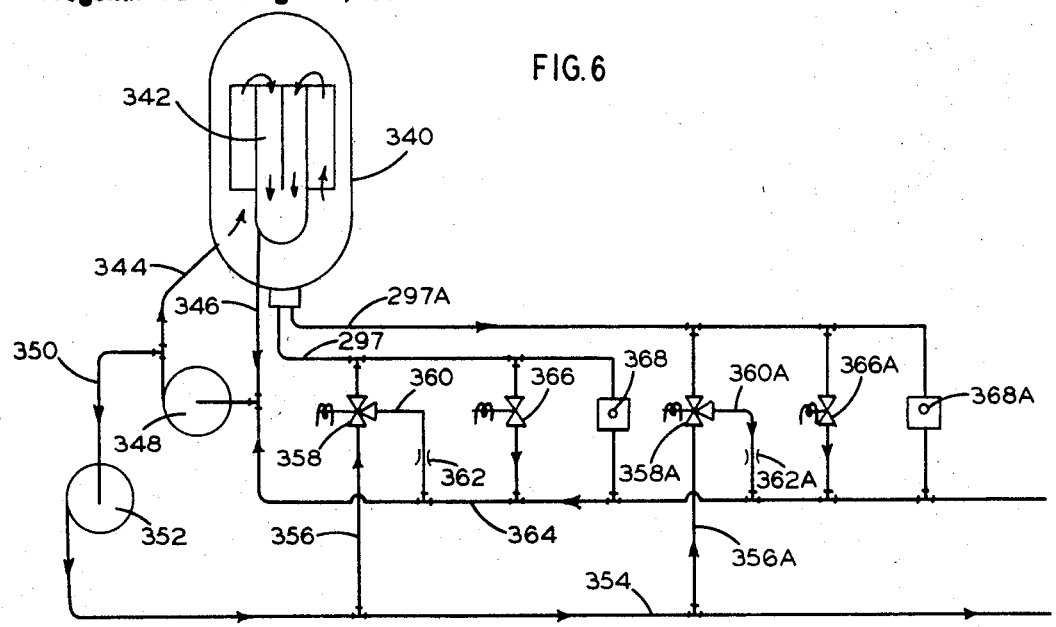
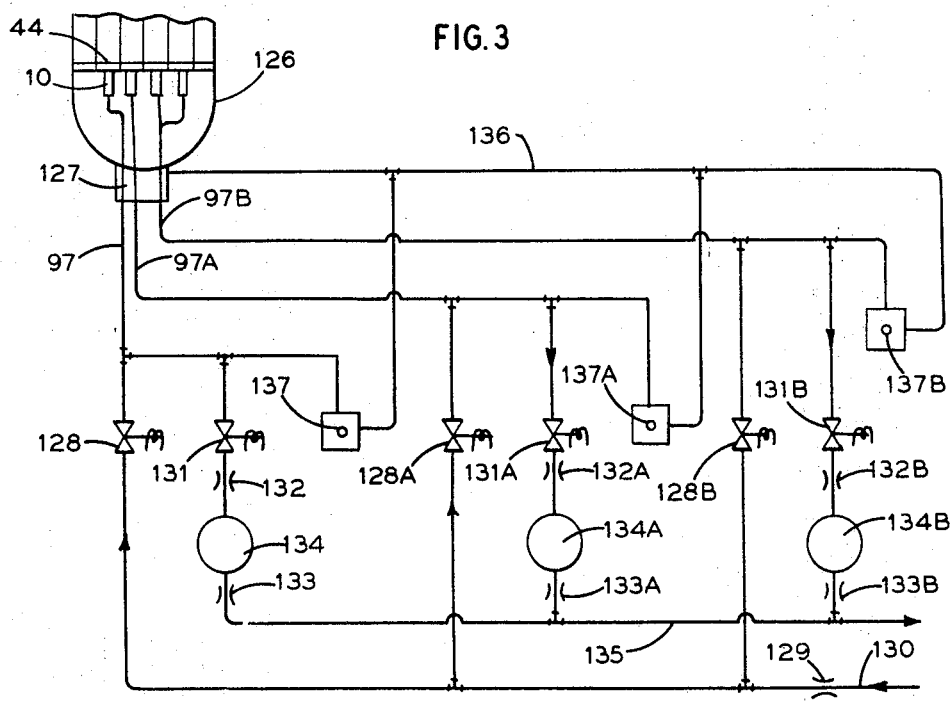

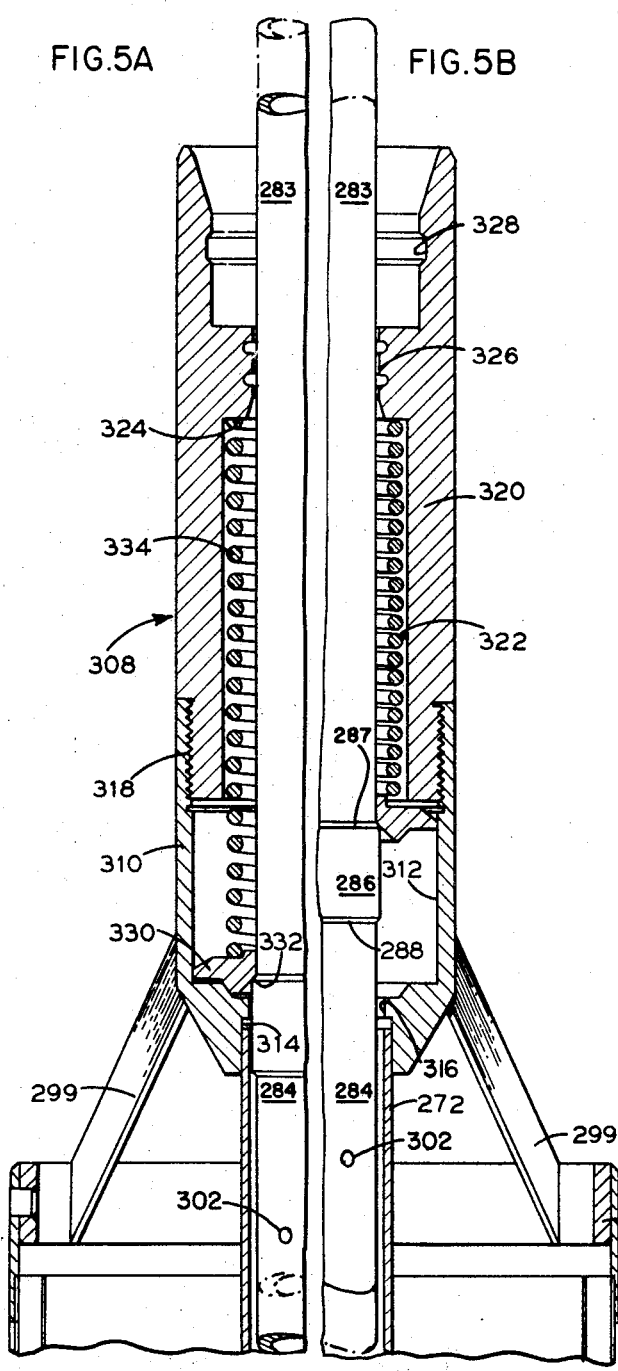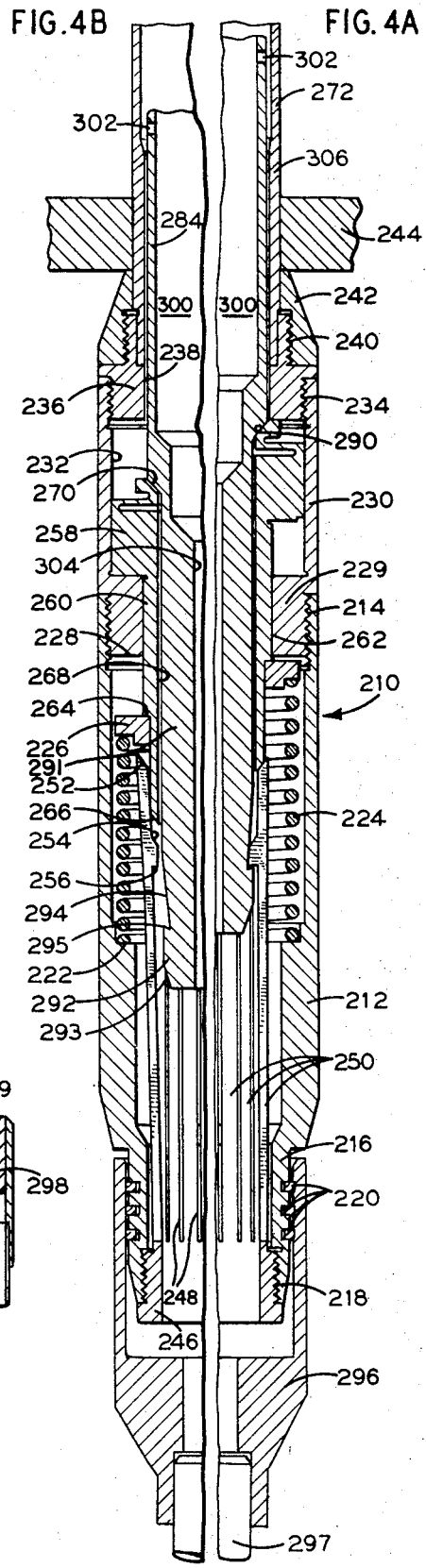

United States Patent Office 3,527,670
Patented Sept. 8, 1970

3,527,670
APPARATUS FOR CONTROLLING A CONTROL ROD IN A NUCLEAR REACTOR
Gordon R. Winders, Lancaster, Ohio, assignor to The Babcock & Wilcox Company, New York, N.Y., a corporation of New Jersey
Continuation of application Ser. No. 480,956, Aug. 19, 1965. This application Dec. 14, 1967, Ser. No. 697,262
Int. Cl. G21c 7/16, 7/20
U.S. Cl. 176—36                              11 Claims

ABSTRACT OF THE DISCLOSURE

A method and apparatus for controlling a control rod in a nuclear reactor having a control rod which is hydraulically movable in and out of the reactor core. A hydraulically operated actuator disposed within the nuclear reactor has a first fluid line extending from the actuator to a source of fluid disposed externally of the reactor. The first line has a first valve arranged to admit fluid to the actuator from the source for raising the control rod. A second line connected to the first line between the first valve and the reactor extends to a low pressure receiver. The second line has a second valve arranged to remove fluid from the actuator to the receiver for lowering the control rod. A means for latching the control rod is provided to normally hold the control rod in the core. The valves are alternately opened and closed in a predetermined sequence to first lower the control rod to release the latch before the rod can be raised out of the core.

CROSS REFERENCE

This application claims an invention disclosed in prior filed copending application Ser. No. 480,956, now abandoned, for a "Nuclear Reactor Control Rod Actuator," filed Aug. 19, 1965 by the same inventor, and is a continuation thereof.

BACKGROUND AND SUMMARY OF THE INVENTION

This invention relates in general to a nuclear control rod actuator, and more specifically to a hydraulically operated, fail-safe, control rod actuator for moving a control rod containing a neutron poison material into or out of a nuclear reactor core.

A self-sustaining nuclear chain reaction utilizes neutrons which cause atoms of a nuclear fuel material to fission, releasing additional neutrons and other energy which may be utilized for useful purposes. The power generated by a nuclear reactor is determined by the arrangement and amount of nuclear fuel within the reactor core. The power level may be regulated by varying the number of neutrons available for sustaining the chain reaction, the available neutrons being determined by the number of neutrons generated by the fissioning of the fuel material minus the neutrons lost from the periphery of the reactor and those absorbed nonreproductively either by the structural material within the core and by neutrons poison material introduced into the core for control purposes.

The neutron poison material is generally arranged in control rods which are movably positionable within the core. Thus, as the control rods are moved into the core more poison material is introduced and the power level of the reactor is reduced and, in many reactors, full insertion of all of the control rods terminates the chain reaction. Conversely, as the control rods are withdrawn from the core, less poison material is present to reduce the number of neutrons available to continue the chain reaction and the power level is increased. Thus, both the regulation of power produced and the termination of the chain reaction are accomplished by the same control rods.

In other reactors, however, one or more regulating rods are used to control the power level with separate and distinct safety rods being utilized to terminate the chain reaction. Such safety rods are required to have only two positions with respect to the core, either within the core or out of the core.

Still another type of reactor is controlled by utilizing a multiplicity of relatively small control rods which are either in or out of the core. In this reactor the amount of poison material carried by a single control rod is a relatively small portion of the total amount of material required for control of the reactor. Thus, actuation of an individual control rod produces only a small change in the power level of the reactor. Furthermore, since the incremental changes in power resulting from the positioning of the control rods may be evenly distributed throughout the cross-section of the reactor core, the fuel material within the core is used more uniformly throughout the useful life of the core, thereby resulting in more efficient and more complete utilization of the nuclear fuel. It has been found that these multiple control rods are simpler and more economic than those of the prior art. Even though the number of control rods utilized in such a reactor may be greater than the number required by the arrangements of the prior art, the individual control actuating mechanism is simplified so that unit costs are far less than the control rod drives of the prior art.

Control rod drives of the prior art generally have been located outside of the reactor pressure vessel so that the drive components were not subjected to the high temperature and high radiation environment within the reactor itself. However, the development of higher temperature and higher pressure reactors has increased the problems associated with alignment of the exterior control rod actuators and the control rods within the reactor core. This alignment problem has resulted from the utilization of dissimilar metals in the components, i.e. reactor pressure vessels and core, having widely different coefficients of thermal expansion. For example, reactor pressure vessels are normally fabricated of carbon steel having a coefficient of thermal expansion of approximately seven, while the reactor internals are normally of stainless steel, which has a coefficient of thermal expansion of about 10. Moreover, as the operating temperatures of these components are increased the misalignment problem is magnified. Accordingly, it has become increasingly desirable to develope a control rod actuator which can be positioned within the reactor pressure vessel and, if possible, immediately adjacent the reactor core.

It has been found that the location of such control rod actuators within or adjacent the reactor core necessitates the use of a hydraulic rather than an electric actuator, since electrical insulation tends to fail when subjected to the high temperatures, pressures and radiation levels encountered within modern high power reactors. Moreover, penetration of the pressure vessel to accommodate electric connections is more complex than is the penetration of the pressure vessel with a hydraulic line.

It has previously been considered undesirable to utilize hydraulically driven control rod actuators because of the fear that a rupture in the reactor primary system piping could depressurize the system, thereby creating an abnormally high pressure drop across the core, and thus across the control rod, which would drive out any control rods that were in the core at that time and produce an uncontrolled surge of reactivity just at the time the reactor should be scrammed.

Accordingly, the present invention is directed to an improved hydraulically operated control rod actuator and to a system and method of operating the actuators with the capability of moving the control rods either fully into or out of the reactor core.

Furthermore, the present invention provides a hydraulically operated control rod actuator which utilizes only a single hydraulic fluid supply line for all of the actuator functions so the control rod may be locked or unlocked in either the inserted or withdrawn position and raised or lowered relative to the core. The actuator fluid supply line also affords means for indicating whether the control rod is fully inserted and latched in place within the core, or secured in the fully withdrawn position.

In addition, the control rod actuator of the present invention requires a particular, precise sequence of actuator fluid flow in order to withdraw the control rod from the reactor core. The application of any other sequence of actuator fluid flow to a control rod latched in the inserted position will not unlock the latch. As a result, it is highly improbable that any accident could occur either to the reactor or to the actuator fluid supply that would duplicate the particular sequence of actuator flow necessary to affect control rod movement. The actuator of the present invention thus is substantially fail-safe. Moreover, with the arrangement of the present invention, should a failure occur in the reactor coolant outlet piping, there is no possibility that control rods in the core will be driven out by the sudden increase in the pressure differential thereacross.

Accordingly, the present invention provides a nuclear control rod actuator comprising a tubular member having a control rod movably disposed therein and including a source of pressurized actuator fluid in communication with one end of the tubular member. In the proper circumstance, the fluid operates to drive the control rod to the opposite end of the tubular member and to hold it there. A latch means is provided at one end of the tubular member and is arranged to retain the control rod there against the action of any possible flow of the actuating fluid. A piston arrangement at the one end of the tubular member, upon sustained motion of the control rod towards the one end, operates to unlock the latching means to permit movement of the control rod. The piston is disposed within a housing having a restricted fluid opening so that upon reversal of movement of the control rod the action of the piston is restrained, or snubbed, until the control rod has been driven beyond the latching means.

The opposite end of the tubular member may also incorporate a latching means similar to that disposed in the first end of the tubular member.

More particularly the invention is a method and apparatus for operating a nuclear reactor control rod actuator disposed within a nuclear reactor having a core through which primary coolant is circulated. The actuator generally comprises a tubular member associated with the core and having a control rod movably disposed therein. One end of the tubular member is in coolant flow communication with the interior of the reactor. A normally closed latch is arranged in the other end of the tubular member for engaging the control rod to hold the same within the reactor core. A spring returnable piston, fitted in the tubular member, hinders fluid flow intermediate the piston and tubular member. The piston is movable by the control rod for disengaging the latch from the control rod when the rod is hydraulically moved downwardly. A first fluid line connects the actuator to a source of coolant exterior of the reactor, the source being held at a pressure greater than the pressure of the coolant within the reactor. A second fluid line connects the actuator to a low pressure receiver. The first line is provided with a first valve connected in the first line exterior of the reactor. The second line is connected to the first line between the first valve and the reactor, and is provided with a second valve.

In operation, assuming the control rod is engaged by the latch and being held within the core, reducing the actuator pressure moves the control rod downwardly which in turn moves the piston downwardly. The piston compresses the spring and disengages the latch from the control rod. Increasing the actuator pressure immediately thereafter moves the control rod upwardly out of the core while the latch is being held disengaged by the piston. Reducing the pressure causes the rod and piston to move downwardly, but increasing the pressure causes only the rod to move upwardly, the slow rate of fluid flow past the piston damping the spring return of the piston. When the pressure is reduced the latch is thus held disengaged while the control rod is moved upwardly out of the core. Referring particularly to the operation of the valves and assuming both valves to be initially closed, the control rod would be held within the core by the latch. If the second valve is then opened and the first valve remains closed, coolant pressure in the actuator is reduced as compared to the interior of the reactor since the actuator is vented to the low pressure receiver. The control rod, carrying the piston therewith, moves downwardly into the low pressure area due to the pressure differential across the rod. The piston opens the latch to release the control rod. Thereafter, if the second valve is closed and the first valve immediately opened, coolant pressure in the actuator is increased as compared to the interior of the reactor since the actuator is in fluid flow communication with the source of high pressure coolant. The control rod moves upwardly away from the actuator due to the pressure differential across the rod, and the piston is slowly spring returned to prevent the latch from engaging the rod as it passes the latch.

BRIEF DESCRIPTION OF THE DRAWINGS

FIG. 1A is a part section illustrating a first embodiment of a control rod actuator assembly wherein the control rod is in the latched position;

FIG. 1B is a part section showing the control rod in the unlatched position just prior to withdrawal from the reactor core;

FIG. 2 illustrates the upper end of the control rod actuator shown in FIGS. 1A and B with the control rod withdrawn from the core;

FIG. 3 schematically illustrates a control rod actuator system utilizing the actuator shown in FIGS. 1A, 1B, and 2;

FIG. 4A is a part section illustrating a modified control rod actuator assembly with the control rod in the latched position;

FIG. 4B is a part section showing the modified actuator with the control rod in the unlatched position just prior to withdrawal from the reactor core;

FIGS. 5A and 5B illustrate the upper end of the control rod actuator shown in FIGS. 4A and B with the control rod withdrawn from the core; and FIG. 6 schematically illustrates a control rod actuator system utilizing the actuator shown in FIGS. 4A, 4B, 5A and 5B.

DESCRIPTION OF THE PREFERRED EMBODIMENTS

A control rod actuator of the present invention is illustrated, in the part sections, in FIGS. 1A and 1B. The actuator 10 comprises a cylindrical latch housing 12 having an internally threaded upper end at 14. The lower end of the latch housing has a necked-down portion 16 which is internally threaded at 18. A plurality of seal rings 20 are provided in the outer surface of the necked-down portion 16 and will be described in greater detail later. The inner surface of the cylindrical housing 12 is provided with a shoulder 22 on which seats the lower end of a coiled compression spring 24. An annular plate spring retainer 26 fits within the latch housing 12 and retains the upper end of spring 24. The spring retainer in turn is maintained within the latch housing 12 by the lower surface 28 of an externally threaded lower end 29 of a snubber housing 30 which engages the internal threads of the upper end 14 of the latch housing.

The snubber housing 30 has a substantially smooth internal bore 32 which terminates at its upper end in an internal thread 34 into which is screwed a snubber housing cap 36 having a centrally disposed opening 38 arranged therein. An externally threaded upper extension 40 extends from the upper surface of cap 36 concentric with and spaced from the central opening 38. The upper extension 40 screws into an internally threaded cap member 42 which is fixedly connected, as by welding, to the lower surface of a fuel element bottom grid plate 44.

A hold down latch member 46 having a generally tubular shaped and threadedly connected to the threaded lower end 18 of the latch housing extends upwardly into the latch housing 12 and terminates within spring 24. This latch member is longitudinally slotted along its length and about its periphery from the upper end, as at 48, to form a plurality of spaced sprung finger members 50. The upper ends of the members 50 are provided with an inwardly sloping surface 52. Spaced from the upper end of the finger members are second inwardly projecting sloping surface 54 and complementary latch surface 56, the operation of which will be more clearly described hereinafter.

A cylindrical snubber piston 58 is arranged within the snubber housing 30 and is arranged to have a substantially fluid tight fit within the internal bore 32 of the snubber housing. The piston 58 is provided with a smaller diameter tubular sleeve portion 60 extending downwardly from the lower surface thereof through bore 62 in the threaded lower end 29 of snubber housing 30. The sleeve 60 is provided with a shoulder 64 which engages the upper surface of spring retainer 26, the sleeve extending through the center opening thereof and terminating in a beveled surface 66. Beveled surface 66 normally engages surface 52 at the upper end of spring fingers 50 when the snubber piston 58 is in its uppermost position as in FIG. 1A. The piston 58 and sleeve 60 are provided with a centrally disposed bore 68 which extends therethrough. The upper surface of piston 58 is provided with a flexibly connected beveled seating surface 70.

A control rod guide tube 72 is supported at its lower end by the snubber housing cap 36 within upper extension 40 and the threaded cap 42 which is attached to the bottom grid plate 44 of the fuel element. The control rod guide tube extends upwardly through the bottom grid plate 44 and is secured at the upper end in the lower end of the upper snubber 74 (FIG. 2) which subsequently will be more fully described. A flow restricting labyrinth-type sleeve 76 is disposed within the lower end of the control rod guide tube 72. A helical flow path 78 is provided between the sleeve 76 and the inner wall of the control rod guide tube 72 which flow path opens at the upper end to the interior of the control rod guide tube as at 80 and at the lower end to the exterior of the control rod guide tube via openings 82 in the threaded cap member 42.

The lower end of a control rod 83 is shown in FIG. 2 and comprises a tubular member containing in part a neutron poison material as is well known in the art. The neutron poison material bearing portion of the control rod has a length substantially equal to the length of the fuel bearing portion of the fuel element. Only the lowermost end of the poison bearing portion is illustrated in FIG. 2 where the control rod is shown in the uppermost position, out of the reactor core. The upper end of the control rod is exposed to primary coolant within the reactor pressure vessel 126 (see FIG. 3). FIGS. 1A and 1B show the control rod in the lowermost position, within the reactor core. The diameter of the control rod 83 is less than the inner diameter of the control rod guide tube 72, thereby forming a flow space therebetween. The lower portion 84 of the control rod, illustrated in FIGS. 1A, 1B, and 2, and which is joined to the control rod 83 by an enlarged collar section 86 via conical surfaces 87 and 88, has substantially the same diameter as the rod 83. A reverse conical surface 89 joins the lower conical surface 88 to the lower portion 84 of the conical control rod and forms a latching groove which will be described later. The lower end of portion 84 of the control rod terminates in an inwardly and downwardly sloping conical surface 90 (FIGS. 1A and 1B) which connects to a small diameter lower end assembly 91. The length of the portion 84 of the control rod is substantially equal to the distance between the upper end of the labyrinth sleeve 76 and the upper beveled seating surface 70 of the snubber piston 58 when the piston is in its lowermost position. The length of the small diamter end assembly 91 is substantially equal to the length of the snubber piston 58 and sleve 60 and when in the core, i.e., in the down position, extends through the centrally disposed bore 68 in the snubber piston and sleeve. A control rod end cap 92, having a conical lower end 93, is connected to the lower end assembly 91 of control rod via a conical portion 94. The diameter of cylindrical portion of end cap 92 is substantially equal to the diameter of lower end portion 91 and, in combination with the conical section 94, forms a seating surface 95 which is engaged by latch surface 56 of the sprung-finger members 50 in the hold-down latch when the control rod is in the reactor core. This condition is shown in FIG. 1A.

The actuator 10, connected below the bottom grid plate 44 of the fuel element, is arranged to funciton as an integral component of the fuel element. When the fuel element is positioned in the reactor core the lower, necked-down end portion 16 of the latch housing is removably located in a cup-shaped member 96 which is permanently disposed within the reactor. The cup-shaped member 96 is connected to an actuator fluid line 97 which extends through the reactor pressure vessel wall to a source of actuator fluid. The actuator fluid line 97 is arranged to introduce the actuator fluid into the lower end of the tubular hold-down latch member 46. The seal rings 20 in the outer surface of the necked-down portion 16 of the latch housing 12 provide a substantially fluid tight joint between the actuator and the cup-shaped member 96.

The upper snubber 74 is connected to the upper grid member 98 of the fuel element by support arms or members 99. The snubber comprises a lower cylindrical housing member 102 which has a bore 103 extending substantially the full length thereof. The lower end of the housing is provided with a recessed portion 104 into which the upper end of the control rod guide tube 72 is fitted. The lower end of the housing is also provided with an opening 105 superjacent recessed portion 104, extending therethrough coaxial with inner bore 103 and the control rod guide tube 72. The lower inner end of bore 103 is provided with an inwardly projecting annular spring bearing surface 106 which assists in defining the subjacent bore 107. The bore 107 in conjunction with conical surface 108 provides a re-entrant type inlet which is concentric with the opening 105.

The upper end of housing 102 is internally threaded at 109 for connection to a cylindrical upper housing member 110. The lower portion of housing member 110 is provided with a bore 111 concentric with and of somewhat smaller diameter than bore 103 in the lower housing member 102. Upwardly extending bore 111 terminates at its upper end in an annular surface 112 defined by bore 111 and superjacent smaller diameter bore 113 coaxial therewith. Bore 113 extends upwardly and terminates in a spring seat 114 circumscribing coaxial opening 115 which extends through the upper end of the upper housing member 110. The upper end of the upper housing member 110 may be provided with a handling groove 116, in a manner well known in the art, which may be used for grasping the entire control rod-fuel element assembly.

An upper latch member is arranged within the upper snubber 74 and comprises a piston portion 117 having a diameter substantially equal to that of bore 111 so that it has a substantially fluid tight, sliding fit therein. An upper tubular extension 118 extends upwardly from the upper surface of the piston portion 117, having a length sufficient to extend through the upper bore 115 of the upper housing member 110 when the piston portion 117 is at the lowest position of its travel within bore 111. The tubular extension 118 has a substantially fluid-tight fit in bore 115 but is provided with elongated openings 118A arranged to permit fluid flow into bore 111 when the piston portion 117 is in the lower end thereof and when it is moved downwardly therefrom, but to prevent fluid flow when the piston portion is moved up in bore 111. A helical spring member 119 is arranged between the upper surface of the piston portion 117 and the spring seat 114, encircling the outer periphery of the upper tubular extension 118 and serves to urge the piston portion downwardly. The downward travel of piston portion 117 within bore 111 is limited by an annular spring retainer member 120 which is urged against the under side of the piston portion 117 by a helical spring 121 which is supported at the lower end by spring bearing surface 106 in the lower housing member 102. Spring 121 is stronger than spring 119 so that during normal operating conditions the annular spring retainer member 120 will be held at its uppermost position and the piston portion 117 is in its neutral position in bore 111. The piston portion is provided with a central opening, coaxial with the control rod guide tube 72, which has a flexible annular seating surface 117A. Thus when the control rod reaches the upper limit of its travel it will seat on 117A.

The piston portion 117 also has attached thereto a downwardly extending, generally tubular latch member which is longitudinally slotted from the lower end to form a plurality of spring finger members 122 similar to spring member 50 in actuator 10. The lower ends of the finger members, when the piston portion is in the neutral position terminate below spring bearing surface 106. The lower ends of the sprung finger members 122 are provided with an inwardly sloping surface 123 which terminates in a latch surface 124 and which is arranged to engage conical surface 88 of the control rod 83. Thus, when the rod is in the uppermost position within the control rod guide tube, the control rod is held in the up position, out of the reactor core, by the sprung finger members 122, as shown in FIG. 2.

The control rod actuator system for the actuator illustrated in FIGS. 1A, 1B, and 2 is shown in FIG. 3, wherein a nuclear reactor pressure vessel 126, in which the actuators are located, is provided with a junction box 127 through which the individual actuator fluid lines 97 extend. In the arrangement illustrated three separate actuator systems having individual fluid lines 97, 97A and 97B, respectively, are illustrated. The actuator lines are connected through actuating valves 128, 128A, and 128B, respectively, and a fixed orifice 129 to a high pressure actuating fluid line 130. Actuator fluid line 97 is also connected through an unlatching valve 131, orifices 132 and 133 and scram reservoir 134 to an atmospheric pressure fluid reservoir through scram line 135. Fluid lines 97A and 97B are similarly equipped and tied into scram line 135. Each of the actuator lines 97, 97A and 97B is parallel-connected by a common fluid line 136 with the interior of the reactor, the lines also accommodating differential pressure indicators 137, 137A and 137B, respectively. In a reactor system operating, for example, at a pressure of 3500 p.s.i., the actuator fluid would be supplied to line 130 at approximately 400 p.s.i. and scram line 135 would be maintained at a pressure of approximately 15 p.s.i.

In operation the control rod would be latched in the down position, as illustrated in FIG. 1A, when the fuel element with which it is associated is inserted into the reactor core. Thus the conical surface 90 on the lower end of the control rod would contact and be supported on the beveled seating surface 70 of the snubber piston 58 which would be held in its uppermost position by spring 24 acting upwardly through spring retainer 26 and the shoulder 64 of sleeve 60. The control rod would be held in the down position by the sprung finger members 50 with the latch surfaces 56 engaging the seating surface 95 on the end cap 92 of the control rod. As seen in FIG. 1A, with the snubber piston 58 in its uppermost position, the beveled surface 66 on the lower end of sleeve 60 is just in contact with inwardly sloping surfaces 52 at the upper end of the spring fingers 50. In this position no spurious flow of actuator fluid through line 97 could force the control rod up and out of the reactor core. Neither would it be possible for a rupture in the reactor coolant circuit to create a pressure drop across the reactor core which would force the control rod out of the core, since the rod is securely and positively locked in position by the latch surfaces 56 on spring fingers 50. While the control rod is latched in the down position it is cooled by the circulation of the reactor coolant fluid downwardly through the control rod guide tube 72 and out the bottom of the guide tube through the spirally shaped flow path 78 of the labyrinth sleeve 76 and thence to the exterior of the control rod guide tube via openings 82 in the threaded cap member 42 of the control rod actuator.

In order to drive the control rod up and out of the reactor core, it is necessary to open unlatching valve 131 which, being connected to line 135 at atmospheric pressure, creates a suction in line 97 and on the control rod and the snubber piston 58, moving the piston and control rod downwardly in bore 32 against the action of spring 24. The pressure differential between the top of the control rod guide tube 72 and line 97, when line 97 is open to atmospheric pressure, is sufficient to drive the control rod and piston downwardly, compressing the spring. The fit of piston 58 and sleeve 60 is such that the fluid trapped beneath the piston is slowly discharged through bore 62 adjacent the lower end 29 of the snubber housing 30. As the piston 58 and its associated sleeve 60 is drawn downward against the resistance of spring 24, the beveled surface 66 at the lower end of sleeve 60 first engages the inwardly sloping surfaces 52 of the upper end of the finger members 50, as shown in FIG. 1A, assisting the conical portion 94 of the lower end of the control rod in forcing the fingers outwardly, as shown in FIG. 1B. In the position illustrated in FIG. 1B, the sprung fingers are held outward by the lower end of sleeve 60 so that latch surfaces 56 no longer engage the seating surface 95 of the control rod. When the control rod and actuator are in the position shown in FIG. 1B, unlatching valve 131 is closed and, at the same time, actuating valve 128 is opened admitting high pressure actuating fluid from line 130 into the control rod actuator line 97. Inasmuch as the fit of sleeve 60 within bore 62 is relatively fluid tight as hereinbefore described, the piston 58 is retained in the position illustrated in FIG. 1B while the control rod is driven upwardly through the control rod guide tube 72. The piston is then slowly returned to the upper position by spring 24, permitting the return of sprung fingers 50 to a latching position. By this time the control rod has been driven sufficiently upward so that seating surface 95 is above the flat surface 56 of the spring fingers. The pressure differential between the top of the control rod guide tube 72 and the pressure in line 97 is sufficient to drive the control rod upwardly out of the reactor core.

The control rod having entered the upper snubber 74, as the upper end of the control rod passes through the central opening in the piston portion 117 the flow of actuator fluid is reduced because of the restricted flow space then available, thereby slowing the rate of travel of the control rod. When the control rod is completely out of the reactor core conical surface 87 on the upper end of the collar section 86 of the control rod mates with the flexible annular seating surface 117A, see FIG. 2, which flexes to minimize the shock to both the control rod and the piston portion. The piston portion 117 absorbs the momentum of the upwardly moving control rod by compressing spring 119. At the same time, the piston portion 117 and bore 111 operate as a shock absorber with the flow of fluid from the space above the piston portion being limited by the close fit of the upper tubular extension 118 in bore 115. It will be noted that openings 118A in the upper extension 118 are arranged to close as the piston portion 117 moves upwardly away from the spring retainer member 120 adjacent the lower end of the upper housing member 110.

As the collar section 86 of the control rod enters the upper snubber 74, it engages the inwardly sloping surfaces 123 of the sprung finger members 122, forcing them outwardly and permitting the passage of the collar section. When the control rod has reached the uppermost limit of its travel and conical surface 87 engages seating surface 117A, the latch surfaces 124 of the sprung finger members 122 engage the conical surface 88 at the lower end of the collar section 86 holding the control rod up out of the reactor core. The piston portion 117 and the integral sprung finger members 122 move upwardly with the control rod 83 against the spring 119 which decelerates the upward motion of the control rod. At this time actuator fluid flow through line 97 can be terminated and valve 128 can be shut since no coolant flow is necessary for the control rod when it is out of the reactor core.

The control rod is released from the up position by opening valve 131 leading to scram line 135. The pressure differential across the control rod caused by opening valve 131 causes the control rod 83 and the piston portion 117 to move downwardly against the force of spring 121 acting through the annular spring retainer member 120. As the piston portion and the sprung finger members 122 move downwardly, surfaces 123 of the finger members 122 engage the re-entrant-type conical surface 108 in the lower end of bore 107, forcing the finger members outwardly releasing latch 124. The control rod, under the combined influence of gravity and the pressure differential thereacross, then enters the reactor core.

As the control rod reaches the lower end of the control rod guide tube 72, the lower end of the control rod enters the labyrinth sleeve 76 creating a restricted flow space about the control rod and reducing the pressure differential of the fluid thereacross and snubbing the downward travel of the control rod. The conical surface 90 in the lower portion of the control rod then mates with the flexibly connected seating surface 70 in the upper end of snubber piston 58 which absorbs the initial impact of the rod thereon. Valve 131 is closed after the control rod enters the labyrinth sleeve 76, or allowed to remain open until the spring finger members 50 engage the seating surface 95. The spring 24 is sufficiently strong to prevent downward motion of snubber piston 58 under impact of the descending control rod. Spring finger members 50 thus engage seating surface 95 on the lower end of the control rod, locking it in place.

Referring to FIG. 3, the actuator system is arranged to enhance the fail-safe operation of the subject actuator. Specifically, the reactor primary coolant system, or another suitable source, provides fluid line 130 with actuator fluid through orifice 120 which limits the flow to the actuators to that necessary to raise one rod only. Accordingly, fluid flow through line 130 is not sufficient to move more than one control rod out of the core at a time, thus accidental removal of a large number of control rods is impossible. Actuator valve 128 is preferably of a solenoid operated, normally closed type so that upon failure of reactor control power the actuating valve will automatically shut. Unlatching valves 131, 131A and 131B are solenoid operated, normally open valves held closed by the reactor control power so that upon failure of the control power they automatically open driving the control rods into the core, shutting down the reactor.

It should also be noted that orifice 132 in the unlatching line is arranged to modulate the flow, thereby limiting pressure drop across the control rod and thus limit the rate of control rod insertion and the attendant force to be absorbed by the snubber piston 58. The scram reservoir 134 and the orifice 133 cooperate to assure that there will be sufficient pressure drop in the actuator circuit upon the opening of valve 131 so that the control rod will be driven into the reactor core regardless of how many other control rods are being driven in the core at the same time. Accordingly, should one control rod be in the process of being inserted, scram line 135 might be sufficiently loaded to prevent the insertion of an additional control rod were it not for the scram reservoir 134. Orifice 133 limits the feedback of fluid from line 135 into adjacent scram reservoir 134.

The position of the control rod may be indicated by a differential pressure indicator 137 which is connected between a common fluid line 136, communicating with the interior of the reactor, and the actuator line 97. Full down, i.e. the control rod inserted in the reactor core and locked in position, is indicated by a maximum scalar reading on indicator 137 when actuating valve 128 is opened. Once the control rod is unlatched and is being driven towards the withdrawn position, the indicator reading will be substantially reduced. Thereafter, full out position is indicated by an increased intermediate reading when the control rod seats in the upper snubber.

Accordingly, with the actuator of the present invention a control rod may be raised, lowered, and locked in the inserted position, and an indication of all of these operations may be obtained utilizing only one fluid line and pressure vessel pentration for each control rod. Furthermore, the present invention provides a hydraulic system which is fail-safe, assuring the insertion of the control rods in the event of a malfunction of the reactor control rod system or the actuator fluid supply system. Furthermore, the present arrangement, utilizing a unique, programmed operating sequence, prevents the accidental withdrawal of any control rods from within the reactor core in the event of a failure in the reactor primary coolant system.

An alternative arrangement of the present invention is illustrated in FIGS. 4A, 4B, 5A and 5B wherein parts similar to those described with respect to FIGS. 1A, 1B, and 2 are given the same reference numeral with the prefix "2".

The lower portion 284 of the control rod 283 has an open flow space 300 therein communicating with the exterior of the control rod via openings 302 through the wall thereof. This flow space is open to the lower end of the control rod via passageway 304 and eliminates the need for the labyrinth sleeve illustrated in the arrangement of FIG. 1, by permitting flow of coolant fluid through the lower end portion of the control rod. The snubbing effect provided by the labyrinth arrangement shown in FIG. 1 is provided by the enlarged portion 306 of the lower end of the control rod guide tube 272. This arrangement requires that coolant flow be provided through the actuator fluid line 297 while the control rod is latched in the core and the actuator system is modified accordingly as will be more clearly described hereinbelow.

It will be noted that the alternate snubber arrangement 308 illustrated in FIGS. 5A and 5B with FIG. 5B showing the control rod in the extreme upward position and FIG. 5A showing the control rod in the neutral position. The upper snubber 308 comprises a lower cylindrical housing member 310 which is connected to the upper grid member 298 of the fuel element by support arms 299. The lower housing member 310 has a bore 312 extending substantially the length thereof and is provided with a recessed portion 314 in the lower end in which the upper end of the control rod guide tube 272 is fitted. The lower end of the housing is also provided with an opening 316 extending therethrough coaxial with the inner bore 312 and the control rod guide tube 272. The upper end of housing 310 is internally threaded at 318 for the connection of a cylindrical upper housing member 320 thereto. The upper housing 320 is provided with a bore 322 concentric with and having a smaller diameter than bore 132 in the lower housing member 310. Bore 322 terminates at the upper end in an annular surface 324 which extends between bore 322 and smaller diameter bore 326 which is coaxial therewith and through which the control rod extends when it is out of the core. The upper end of the upper housing member 320 may be provided with a fuel element handling groove 328, as previously described.

A snubber washer 330 having a diameter substantially equal to that of bore 312 is arranged within the lower housing member 310 and is provided with a seat 332 on the lower face thereof which complements and mates with the conical surface 287 of the collar section 286 of the control rod. A compression spring 334 extends between the upper surface of the snubber washer 330 and annular surface 324 in the upper end of the upper housing 320 and operates to urge the snubber washer 330 toward the lower end of bore 312. The compression spring absorbs the kinetic energy of a control rod at the upper limit of its travel, minimizing shock to the reactor structure.

A modified actuator system for the control rod actuator illustrated in FIGS. 4A, 4B, 5A and 5B is shown in FIG. 6. In the system illustrated the reactor pressure vessel 340, in which the actuators are located, contains a core 342 having a first and a second fluid flow pass. The reactor coolant is introduced into the first pass via an inlet line 344 and the coolant is removed from the second pass through an outlet line 346. After passing through a heat sink (not shown) the coolant is then returned to the circulating pump 348 which pumps the coolant fluid to the reactor inlet line 344. The actuator fluid is withdrawn from inlet line 344 at the outlet of pump 348 via line 350 and its pressure is raised by actuator supply pump 352 to approximately 500 p.s.i. above the reactor coolant inlet pressure. The actuator fluid is fed to a common supply line 344 which is connected via lines 356 and 356A to actuator valves 358 and 358A. The valves 358 and 358A are solenoid operated, normally closed three-way valves connecting line 356 with actuator fluid lines 297 and 297A, respectively. These lines penetrate the reactor pressure vessel and each is connected to the lower end of its associated actuators. When actuator valve 358 is energized it connects line 356 with line 297 introducing the actuator fluid into the lower end of the actuator and, when the control rod is unlatched, will drive the rod to the upper end of the control rod guide tube 272 and hold it there. When actuating valve 358 is de-energized, line 297 is open via line 360 through orifice 362 to a return line 364 which communicates with the reactor coolant outlet line 346 at the inlet of circulating pump 348. As a result, the pressure in line 364 is maintained substantially equal to the reactor coolant outlet pressure. Actuator fluid lines 297 and 297A are also connected through normally closed, solenoid operated unlatching valves 366 and 366A, respectively, to return line 364. Each of the actuator lines 297 and 297A is also connected to the return line 364 through differential pressure indicators 368 and 368A, respectively. These indicators operate in a manner similar to those described with reference to FIG. 3, to indicate the position of the respective control rods.

In operation, the control rod 283 would be latched in the down position, as illustrated in FIG. 4A, when the fuel element with which it is associated is inserted in the reactor core. The control rod would thus be held in the down position by the sprung finger member 250. To drive the control rod up and out of the reactor core, unlatching valve 366 is opened creating a suction in line 297 and on the control rod and snubber piston moving the control rod and the piston downwardly in bore 232 against the action of spring 224. When the sprung fingers are unlatched from seating surface 295 of the control rod, unlatching valve 366 is closed and, at the same time, actuating valve 358 is opened admitting high pressure actuating fluid from line 354 via line 356 into the control rod actuator, driving the control rod to the upper end of the core. As the control rod enters the upper snubber 308 and the upper end of the control rod enters upper bore 326, flow of actuator fluid is reduced due to the reduction in flow area thereby slowing the ascent of the control rod until surface 287 of the control rod seats upon seat 332 of snubber washer 330 which then moves upwardly compressing spring 334, halting the upward movement of the control rod. At this time the flow of actuator fluid through actuator line 29 is substantially reduced by the close fit of the control rod in bore 326 and the pressure acts to hold the control rod up out of the core.

The control rod is inserted into the reactor core by closing the actuating valve 358 which opens the actuator line 297 to the return line 364 through line 360 and orifice 362. This results in the control rod being driven down into the reactor core by the pressure drop across the core assisted by gravity. Orifice 362 operates to moderate the flow by regulating the pressure differential across the control rod to prevent excessive control rod insertion speed which might damage the rod or the actuator mechanism. With the control rod latched down in the reactor core it is cooled to coolant fluid passing downwardly through guide tube 272, openings 302 and passageway 304 into the lower end of the control rod, then out through actuator line 297, the three-way actuating valve 358, and line 360 to the return line 364.

The present invention provides a hydraulically operated control rod actuator system which is relatively simple, and accordingly, inexpensive and substantially fail-safe, requiring little, if any, auxiliary equipment. Further, the safety rod actuator of the present invention may be operated by the reactor coolant fluid, utilizing the pressure drop normally occurring across the reactor core. Moreover, the present invention provides an actuator which will positively lock the control rods in the inserted position eliminating the possibility of accidental control rod withdrawal as a result of a primary system depressurization.

What is claimed is:

1. Apparatus for controlling a control rod in a nuclear reactor comprising a nuclear reactor, a guide tube disposed within the nuclear reactor, a hydraulically movable control rod within the guide tube, a snubber housing having a first end and a second end, the first end connected to one end of the guide tube, a latch housing connected to the second end of the snubber housing, a hydraulically movable piston having an axial bore therethrough, the piston disposed in the snubber housing and extending into the latch housing, the control rod having an end portion which extends through the first end of the snubber housing and the piston bore and into the latch housing, a latch member disposed in the latch housing and arranged to engage said end portion of the control rod when the control rod is at said one end of the guide tube to prevent hydraulic movement of the control rod away from said one end of the guide tube, the piston movable in one direction to disengage the latch member to allow hydraulic movement of the control rod in the opposite direction, spring means arranged to urge the piston in said opposite direction, and means for hydraulically moving the control rod.

2. Apparatus as defined in claim 1 wherein the snubber housing has a bore formed in the second end thereof, the piston is fitted in the bore and has a sleeve portion which extends through the bore, the fit of the sleeve within the bore allowing fluid to slowly pass trough the bore such that the piston is slowly returned by the spring means after the control rod is hydraulically moved in said opposite direction away from said one end of the guide tube.

3. Apparatus as defined in claim 1 including a snubber-latch assembly disposed at the other end of the guide tube arranged to decelerate the control rod and to hold it at the other end of the guide tube.

4. Apparatus as defined in claim 3 including means co-operating with the end portion of the control rod to permit flow of fluid around the control rod when it is held at said one end of the guide tube.

5. Apparatus for controlling a control rod in a nuclear reactor comprising a nuclear reactor having a hydraulically movable control rod, a hydraulically operated actuator disposed within the nuclear reactor, a first fluid line arranged to supply the actuator with a fluid from a source of fluid exterior of the reactor, a first valve in the first line arranged to admit fluid to the actuator from the source of fluid for raising the control rod, a second fluid line connected to the first line between the first valve and the reactor, a low pressure receiver connected to the second line, a second valve in the second line arranged to remove fluid from the actuator to the receiver for lowering the control rod, the actuator comprising a tubular snubber housing having a first and a second end, a control rod guide tube having a first and a second end, the first end of the snubber housing connected coaxially with the first end of the guide tube, a tubular latch housing having a first and a second end, the first end of the latch housing connected coaxially with the second end of the snubber housing, a piston having a coaxial bore extending therethrough, the piston movably disposed in the snubber housing, the piston having a sleeve portion extending into the latch housing, the piston having a seating surface disposed adjacent the first end of the snubber housing, the control rod movably disposed in the guide tube, the control rod having an end portion arranged to extend through the bore in the piston when the control rod is at the first end of the guide tube, the control rod having a seating face adjacent the end portion thereof arranged to mate with the seating surface of the piston when the control rod is in the first end of the guide tube, a latch member comprising a plurality of spring finger members disposed in the latch housing and arranged around the axis thereof to engage the end portion of the control rod to hold the control rod at the first end of the guide tube when the control rod is at the first end of the guide tube, the sleeve portion of the piston arranged to engage the finger members to disengage finger members from the control rod upon movement of the piston toward the second end of the snubber housing, spring means disposed in the latch housing around the finger members and sleeve portion of the piston and arranged to urge the piston toward the first end of the snubber housing.

6. Apparatus for controlling a hydraulically movable control rod in a nuclear reactor comprising, a guide tube disposed within the nuclear reactor, the control rod movable within the guide tube, a housing having a first end and a second end, the first end connected to one end of the guide tube, a sleeve within the housing having an axial bore therethrough, the control rod having an end portion which extends through the bore, latch means within the housing arranged to engage said end portion of the control rod when the control rod is at said one end of the guide tube to prevent hydraulic movement of the control rod away from said one end of the guide tube, means for moving the rod and sleeve toward the second end of the housing to disengage the latch means, means for slowly returning the latch means to allow hydraulic movement of the control rod away from said one end of the guide tube, and means for hydraulically moving the control rod.

7. Apparatus according to claim 6 wherein the means for moving the rod and sleeve towards the second end of the housing includes an axially bored piston movably disposed within the housing, said sleeve being a sleeve portion of the piston, and the piston and its associated sleeve portion coaxially bored.

8. Apparatus according to claim 7 wherein the means for hydraulically moving the control rod comprises, said means for moving the rod and sleeve toward the second end of the housing, and means for hydraulically moving the control rod away from said one end of the guide tube.

9. Apparatus according to claim 7 wherein the means for slowly returning the latch means comprises, a compression spring within the housing arranged to return the sleeve toward the first end of the housing.

10. Apparatus according to claim 7 wherein the means for hydraulically moving the control rod comprises, fluid line means connecting the second end of the housing to a source of fluid disposed externally of the reactor, means for reducing the pressure in the fluid line means to move the control rod and sleeve toward the second end of the housing to release the latch means and then pressurizing the fluid line means substantially immediately thereafter to move the control rod away from said one end of the guide tube.

11. Apparatus according to claim 9 wherein the piston and its associated sleeve are moved toward the second end of the housing against the resistance of the spring, and the means for slowly returning the latch means slowly returns the piston with its associated sleeve to slowly return the latch means.

References Cited

UNITED STATES PATENTS

| | | | |
|---|---|---|---|
| 2,855,899 | 10/1958 | Beaty | 176—36 |
| 2,975,119 | 3/1961 | Emmons | 176—36 |
| 3,020,887 | 2/1962 | Hobson et al. | 176—36 |
| 3,020,888 | 2/1962 | Braun | 92—24 |
| 3,347,747 | 10/1967 | West et al. | 176—86 |

FOREIGN PATENTS 612,009  1/1961  Canada.

CARL D. QUARFORTH, Primary Examiner

H. E. BEHREND, Assistant Examiner

U.S. Cl. X.R.

91—44